United States Patent [19]

Ringwall

[11] 3,933,051
[45] Jan. 20, 1976

[54] CLOSED LOOP FLUIDIC ANGULAR RATE GYRO

[75] Inventor: Carl Gustave Ringwall, Scotia, N.Y.

[73] Assignee: General Electric Company, New York, N.Y.

[22] Filed: Oct. 15, 1974

[21] Appl. No.: 514,756

[52] U.S. Cl. .............................. 74/5.6 B; 74/5.6 D
[51] Int. Cl.² ......................................... G01C 19/28
[58] Field of Search ........................ 74/5.6 B, 5.6 D

[56] References Cited
UNITED STATES PATENTS

| | | | |
|---|---|---|---|
| 3,320,816 | 5/1967 | Johnston | 74/5.6 B |
| 3,559,492 | 2/1971 | Erdley | 74/5.6 D |
| 3,604,277 | 9/1971 | Stripling et al. | 74/5.6 B |
| 3,610,053 | 10/1971 | Stripling et al. | 74/5.6 B |
| 3,747,418 | 7/1973 | Hoffman et al. | 74/5.6 B |

*Primary Examiner*—Wendell E. Burns
*Assistant Examiner*—William C. Anderson
*Attorney, Agent, or Firm*—Stephen A. Young; Robert A. Cahill; Frank L. Neuhauser

[57] ABSTRACT

A closed loop fluidic angular rate gyro having a single sensitive axis. The gyro is comprised of a supporting member, fluidic means for sensing movement of the gyro about the sensitive axis, and means for pivotally mounting the sensing means to the supporting member and about a torsional axis which is perpendicular to the sensitive axis to maintain the sensing means in a normal null position and allow limited rotation of the sensing means about the torsional axis in response to the angular velocity of the gyro about the sensitive axis. The gyro is further comprised of fluidic or electrostatic means responsive to movement of the sensing means for providing a restoring torque to return the sensing means to the normal null position and for producing an output signal proportional to movement of the sensing means about the torsional axis, whereby the output signal is proportional to the angular velocity of the gyro about the sensitive axis. The gyro is fixed within an oil filled enclosure, and a flat damping plate is laterally positioned between the upper surface of the enclosure and the sensing means to stabilize the closed loop operation of the gyro.

15 Claims, 7 Drawing Figures

CLOSED LOOP FLUIDIC ANGULAR RATE GYRO

BACKGROUND OF THE INVENTION

1. Field of The Invention

This invention relates to an angular rate gyro, and, more particularly, to a closed loop fluidic angular rate gyro for sensing the angular velocity of the gyro about a single sensitive axis.

2. Description of the Prior Art

Current state of the art angular rate gyros having no moving parts unfortunately have sluggish response time and poor sensitivity, thereby limiting their diversity of application and extent of use. Other types of conventional angular rate gyros, which use mechanical rotating fly wheels, have limited life expectancy and are subject to mechanical damage if exposed to a wider than rated operating range, or if subject to hostile environments which product excessive shock and vibration. Furthermore, most gyros are not adaptable to provide output signals which are compatible with either hydraulic or hybrid electric hydraulic systems.

OBJECTS OF THE INVENTION

It is therefore an object of this invention to provide a low cost rugged angular rate gyro which is capable of withstanding excessive shock and vibration, and which is also capable of being exposed to angular velocities in excess of rated operation.

It is another object of this invention to provide an improved angular rate gyro capable of operating over a wider range with greater sensitivity and dynamic response than current state of the art gyros having no moving parts.

It is another object of this invention to provide an angular rate gyro which is capable of generating output signals that are compatible with either a hydraulic or a hybrid electric hydraulic system.

Other objects of the invention will be pointed out hereinafter.

SUMMARY OF THE INVENTION

According to a broad aspect of the invention, there is provided a closed loop fluidic angular rate gyro having a single sensitive axis. The gyro is comprised of a supporting member, means for sensing movement of the gyro about the sensitive axis, and means for pivotally mounting the sensing means to the supporting member and about a torsional axis which is perpendicular to the sensing axis to maintain the sensing means in a normal null position and allow limited rotation of the sensing means about the torsional axis in response to the angular velocity of the gyro about the sensitive axis. The gyro is further comprised of fluidic or electrostatic means responsive to movement of the sensing means for providing a restoring torque to return the sensing means to the normal null position and for producing an output signal proportional to movement of the sensing means about the torsional axis, whereby the output signal is proportional to the angular velocity of the gyro about the sensitive axis.

The sensing means is comprised of a coil in the form of a multiple turn spiral having a fluid flowing therethrough in a plane substantially parallel to the plane established by the intersection of the torsional axis and the sensitive axis when the coil is in the normal null position, whereby the angular momentum of the fluid flowing through the coil causes an angular displacement of the coil about the torsional axis in response to the angular velocity of the gyro about the sensitive axis. The assembly of the supporting member, the coil, and the pivotally mounting means is fixed within an oil filled enclosure, and a flat damping plate is laterally positioned between an upper surface of the enclosure and the coil to stabilize the closed loop operation of the gyro. The sensing means is structured to be of equal weight to an equal volume of oil to render the gyro insensitive to shock and vibration.

DESCRIPTION OF THE PREFERRED EMBODIMENTS

Figure 1:
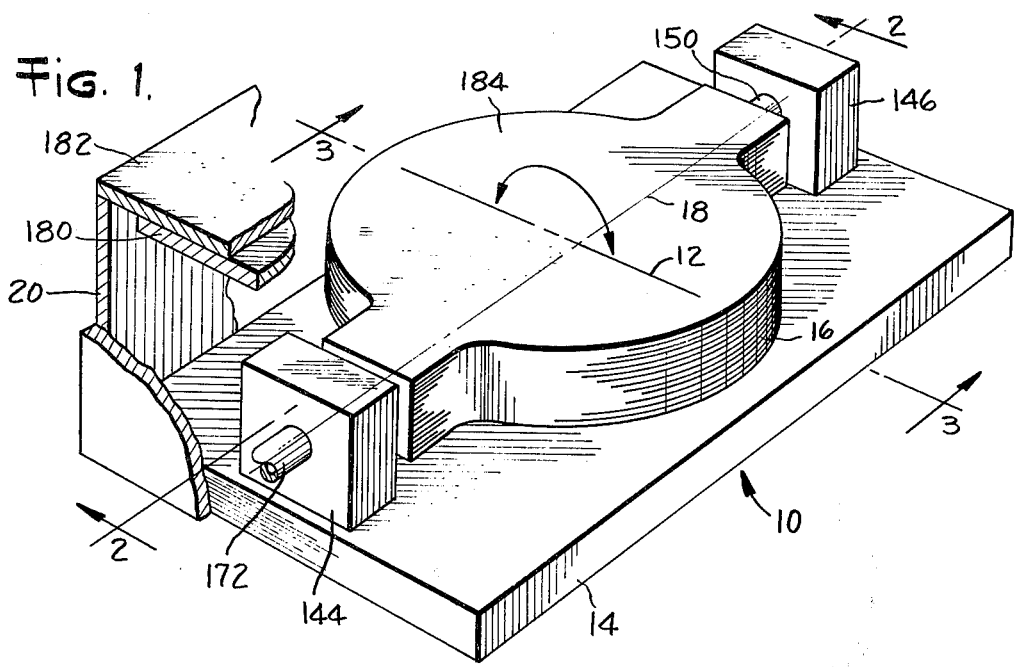
FIG. 1 is a perspective view of an angular rate gyro according to the invention wherein the gyro enclosure is shown broken away so as not to obstruct the view of the remainder of the gyro.

The invention will now be explained with reference to FIGS. 1 to 7 of the drawing.

Figure 2:
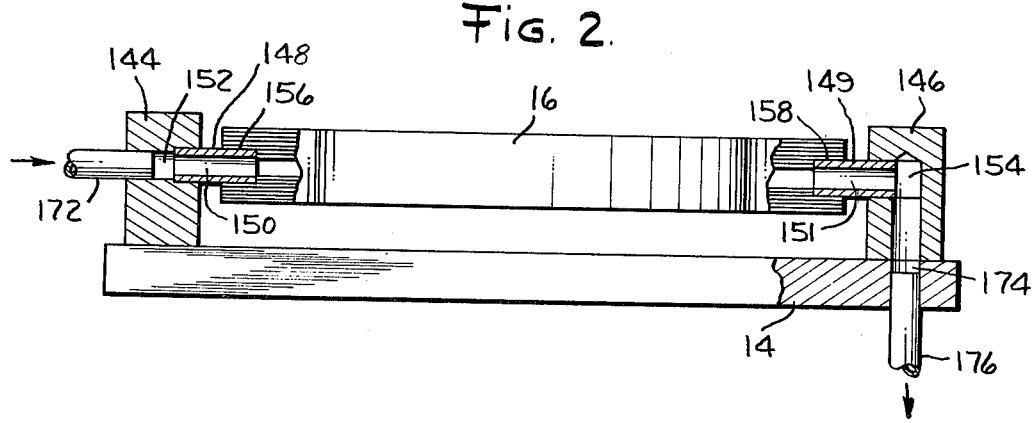
FIG. 2 is a cross sectional view of the gyro shown in FIG. 1 taken along lines 2—2.
Figure 3:
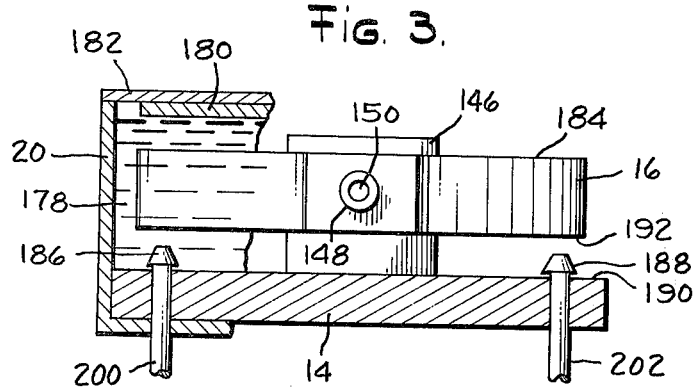
FIG. 3 is a cross sectional view of the gyro shown in FIG. 1 taken along lines 3—3.

Referring particularly to FIGS. 1 through 3, a closed loop fluidic angular rate gyro 10 having a single sensitive axis 12 is comprised of a supporting member 14, means 16 for sensing movement of the gyro about sensitive axis 12, and means for pivotally mounting sensing means 16 to supporting member 14 and about a torsional axis 18 which is perpendicular to sensitive axis 12. The pivotally mounting means maintains sensing means 16 in a normal null position (shown in FIGS. 1, 2 and 3) and allows limited rotation of sensing means 16 about torsional axis 18 in response to the angular velocity of the gyro about sensitive axis 12. Gyro 10 is further comprised of fluidic (shown in FIG. 5) or electrostatic (shown in FIG. 6) means responsive to movement of sensing means 16 for providing a restoring torque to return the sensing means to the normal null position and for producing an output signal proportional to movement of sensing means 16 about torsional axis 18, whereby the output signal is proportional to the angular velocity of the gyro about the sensitive axis.

Supporting member 14 is comprised of a rigid solid rectangular structure which is fixed to a bottom surface (not shown) of an enclosure 20 for the gyro.

Sensing means 16 is comprised of a coil 22 (shown in FIG. 4) having a fluid flowing therethrough in a plane which is substantially parallel to a plane established by the intersection of torsional axis 18 and sensitive axis 12 when the coil is in the normal null position. The fluid which flows through the coil may be a suitable liquid or gas. In this instance, by way of example only, the fluid will be considered to be a liquid, such as oil.

Coil 22 is comprised of top and bottom respective cover plates 24 and 26, and respective first and second sections 28 and 30 which are separated by a coupling plate 32.

Section 28 is comprised of first and second respective lamination sheets 34 and 36. Lamination 34 is comprised of an elongated slot 38 extending through an end portion 40, and a hole 42 extending through an oppositely situated end portion 44. Lamination 34 further includes a multiple turn spiral passageway 46 having an outer end 48 fluidically coupled to slot 38 and an inner end 50 terminating within a central rib portion 52. Spiral passageway 46 is interrupted by respective spokes 54, 56 and 58 which are spaced 120° apart from each other. Similarly, lamination 36 is comprised of an elongated slot 60 in an end portion 62, and a hole 64 in an opposite end portion 66, wherein slots 60 and 38 are aligned and in fluidic communication with each other, while holes 64 and 42 are also aligned and in fluidic communication with each other. Lamination 36 is further comprised of a multiple turn spiral passageway 68 having an outer end 70 fluidically coupled to slot 60 and an inner end 72 terminating within a central rib portion 74. Lamination 36 also has three respective spokes 76, 78 and 80 which interrupt spiral passageway 68, and which are also spaced apart from each other by approximately 120°. Spiral passageway 68 is concentrically aligned and in fluidic communication with spiraling passageway 46. However, the spokes in lamination 36 are out of alignment with the spokes in lamination 34 to insure that the spiral formed by the combination of spiral passageways 46 and 68 of respective laminations 34 and 36 is continuous, and that the oil flowing through the spiral will not be interrupted. It should also be noted that the spokes are necessary to insure that the respective spiral passageways can be definitively maintained within a single plane.

Coupling plate 32 is comprised of first and second holes 82 and 84 within respective end portions 86 and 88, and a coupling slot 90 within a central portion 92. Hole 82 is aligned and in fluidic communication with slot 60 in lamination 36, and hole 84 is aligned and in fluidic communication with hole 64 in lamination 36. Coupling slot 90 is aligned and in fluidic communication with inner end 72 of spiral passageway 68 in lamination 36.

Second section 30 is comprised of substantially identical and concentric laminations 94 and 96. Lamination 94 is comprised of a hole 98 in an end portion 100, a slot 102 in an opposite end portion 104, and a multiple turn spiral passageway 106. An outer end 108 of passageway 106 is fluidically coupled to slot 102, and an inner end 110 of passageway 106 terminates in a central rib portion 112 of lamination 94. Similarly, lamination 96 is comprised of a hole 114 in an end portion 116, a slot 118 in an opposite end portion 120, and a multiple turn spiral passageway 122. An outer end 124 of passageway 122 is fluidically coupled to slot 118 and an inner end 126 of passageway 122 terminates in a central rib portion 128 of lamination 96. Holes 114 and 98 in respective laminations 96 and 94 are aligned and fluidically coupled to hole 82 in coupling plate 32. Slots 118 and 102 in respective laminations 96 and 94 are aligned and fluidically coupled to hole 84 in coupling plate 32. Similarly, respective spiral passageways 122 and 106 in laminations 96 and 94 are concentrically aligned and fluidically coupled together, and respective inner ends 126 and 110 of respective passageways 122 and 106 are fluidically coupled to coupling slot 90 in coupling plate 32. Laminations 96 and 94 are also provided with respective spokes 130, 132 and 134, 136 (the third spoke in each lamination is not shown) wherein spokes 130 and 132 are not aligned with spokes 134 and 136, whereby when the laminations are positioned together, they define a single uninterrupted spiral.

It should be noted that lamination 34 can have slotted regions 140 and 142 located on opposite sides of central portion 52 and between the innermost turn of the spiral passageway of that lamination. Similarly, each of the other laminations can have identical slotted regions located in virtually the same place, whereby when the laminations, the coupling plate and cover plates are assembled together, the slotted regions form air filled pockets or cavities of predetermined volume. It should also be noted that each of the laminations, the coupling plate and cover plates can be chemically etched or stamped, and can then be assembled in a stacked configuration using standard diffusion bonding techniques. While two laminations per section were illustrated, it should be understood that the number of laminations can either be increased or decreased, depending upon the design requirements of the gyro. Additionally, the actual number of spiral turns per lamination is also selected in accordance with specified design requirements of the gyro. While two sections of laminations are shown by way of illustration, it should be understood that additional sections could be provided as required. The reason that two sections have been shown, is that since the coil is in the form of multiple turn spiral passageways, it is necessary to have at least two sections in order to allow the oil to flow into the spiral from the outer ends of the spiral passageways of one section and out of the outer ends of the spiral passageways of the other section.

Figure 4:
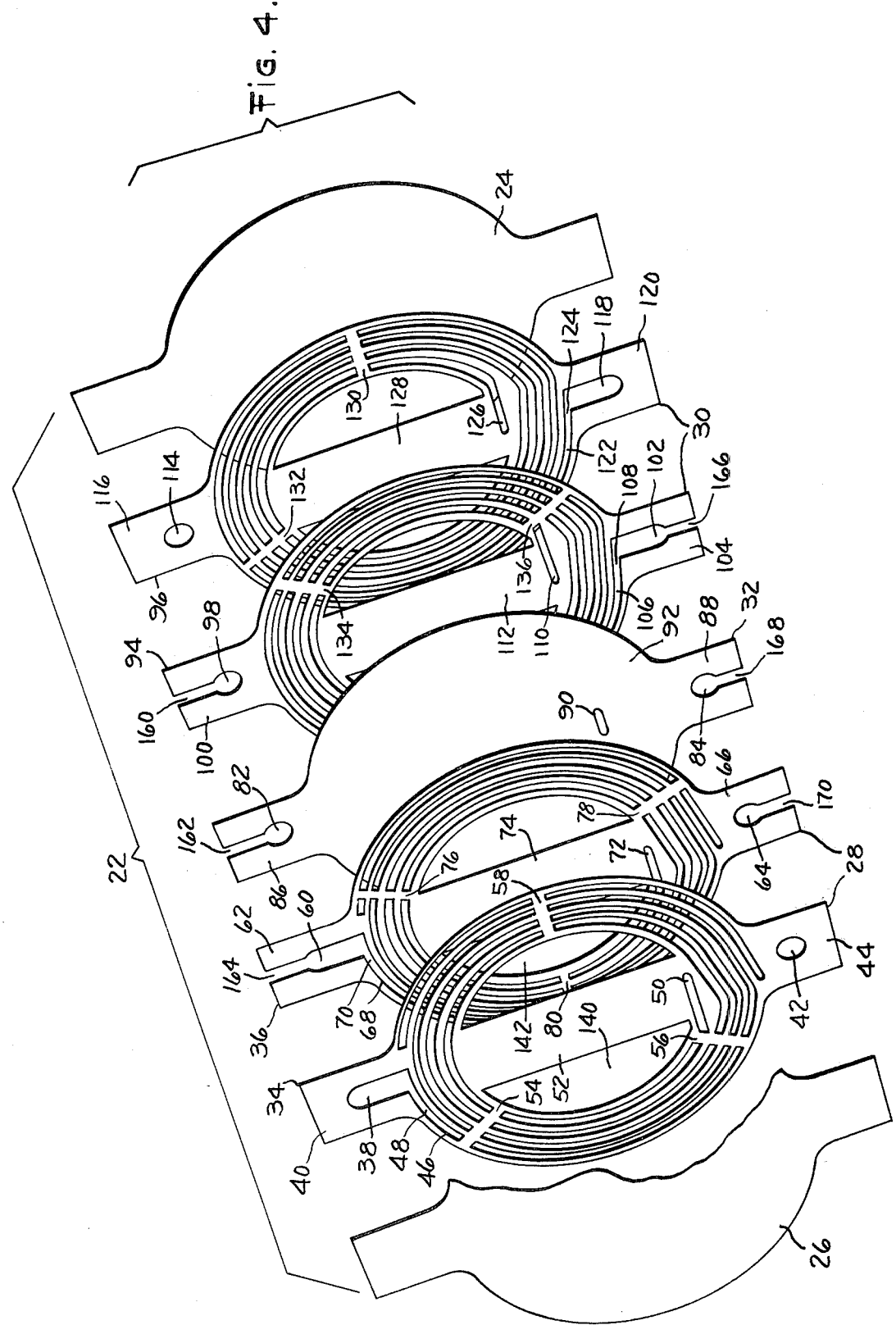
FIG. 4 is an exploded perspective view of the sensing means of the gyro.

It should also be noted that the spiral passageways in the laminations of the first and second sections are aligned in a manner to insure that the liquid flows through the coil in one direction (i.e. counterclockwise with reference to the bottom perspective view of FIG. 4, and clockwise with reference to a top perspective view shown in FIG. 1). This flow in a single direction is required so that the fluid flows in a plane substantially parallel to a plane established by the intersection of the torsional axis and the sensitive axis when the coil is in the normal null position shown in FIGS. 1 and 3. The fluid flowing through the coil has an angular momentum which is proportional thereto. The angular momentum causes an angular displacement of the coil about the torsional axis in response to any angular velocity of the gyro about the sensitive axis. For example, referring to FIG. 1, if the angular velocity of the gyro about sensitive axis 12 is in the clockwise direction as shown, then sensing means 16 will be angularly displaced proportionally thereto in the clockwise direction about torsional axis 18, while the fluid is flowing through the sensing means in the clockwise direction. Similarly, if the angular velocity of the gyro is in the counterclockwise direction with respect to sensitive axis 12, then sensing means 16 will be proportionally displaced in the counterclockwise direction about torsional axis 18 while the fluid flowing through the coil is still in the clockwise direction.

Referring to FIGS. 1 and 2, the pivotally mounting means is comprised of first and second posts 144 and 146, and first and second tubular flexure springs 148 and 149 having respective passageways 150 and 151 therethrough. Posts 144 and 146 are fastened to supporting member 14 using standard fastening techniques. One end of respective flexure springs 148 and 149 are fixed within and fluidically coupled to respective passageways 152 and 154 within respective posts 144 and 146. The other end of respective flexure springs 148 and 149 are fixed within and fluidically coupled to respective input and output passageways 156 and 158 of sensing means 16. In this instance, passageways 156 and 158 are formed by machining respective channels in opposite ends of the diffusion bonded stacked configuration which comprises coil 22 shown in FIG. 4. The channel which defines passageway 156 is comprised of respective slots 160, 162 and 164 in respective end portions 100, 86, and 62 of respective lamination 94, coupling plate 32, and lamination 36, wherein these slots are fluidically coupled to respective outer ends 70 and 48 of respective spiral passageways 68 and 46 of respective laminations 36 and 34 via respective holes 98 and 82 and slots 60 and 38 in respective lamination 94, coupling plate 32 and laminations 36 and 34. Similarly, the channel defining passageway 158 is comprised of slots 166, 168, and 170 in respective end portions 104, 88, and 66 of respective lamination 94, coupling plate 32 and lamination 36, wherein the slots are fluidically coupled to respective outer ends 124 and 108 of respective spiral passageways 122 and 106 of respective laminations 96 and 94 via respective holes 64 and 84 and slots 102 and 118 in respective lamination 36, coupling plate 32 and laminations 94 and 96. Passageway 152 in post 144 is fluidically coupled to a source of oil via a tubing 172, and passageway 154 in post 146 is fluidically coupled to an oil reservoir via a passageway 174 in supporting member 14 and a tubing 176. Flexure springs 148 and 149 tend to maintain the coil in the normal null position, while allowing it to have limited angular displacement about torsional axis 18 in response to the angular velocity of the gyro about the sensitive axis. The oil flows from the source of supply through tubing 172, passageway 152 in post 144, passageway 150 in flexure spring 148, and then through spiral passageways 68 and 46 in laminations 36 and 34 via holes 98 and 82 and slots 60 and 38 in respective lamination 94, coupling plate 32, and laminations 36 and 34. The oil then flows through spiral passageways 68 and 46 and out of their respective inner ends 50 and 72 and into inner ends 110 and 126 of spiral passageways 106 and 122 of laminations 94 and 96 via coupling slot 90 in coupling plate 32. Then the oil flows through spiral passageways 106 and 122 and out of their respective outer ends 108 and 124 and into passageway 151 of flexure spring 149 via slots 118 and 102 and holes 84 and 64 in respective laminations 96 and 94, coupling plate 32 and lamination 36. The oil then returns to an oil reservoir via post passageway 154, supporting member passageway 174 and tubing 176.

Referring to FIG. 3, enclosure 20, which houses the assembly of supporting member 14, the pivotally mounting means and sensing means 16, is filled with oil 178, and a damping plate 180 is attached to an inner surface of the top 182 of enclosure 20. Plate 180 is laterally positioned between the top of enclosure 20 and a top surface 184 of sensing means 16. The combination of the oil filled enclosure and damping plate 180 serve to stabilize the closed loop operation of the gyro.

Figure 5:
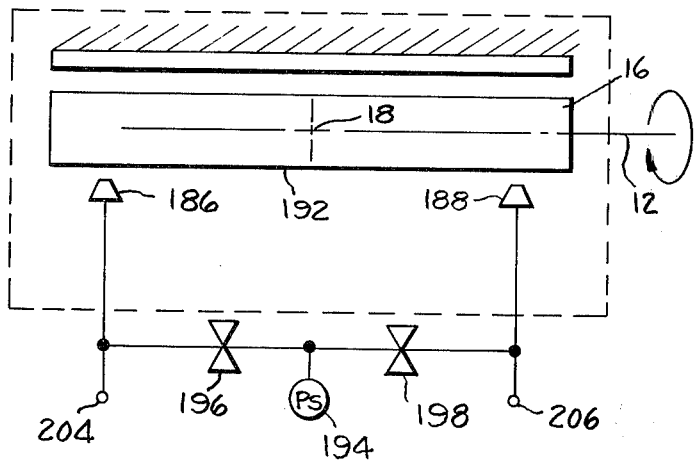
FIG. 5 is a schematic view of the gyro having a fluidic output.

Referring to FIGS. 3 and 5, the fluidic responsive means is comprised of means for applying first and second fluidic signals to sensing means 16 at respective points equidistant from and on opposite sides of torsional axis 18. The applying means is further comprised of first and second flapper nozzles 186 and 188 positioned within an upper surface 190 of supporting member 14 for directing the first and second fluidic signals to opposite sides of an undersurface 192 of sensing means 16. The fluidic signals, in this instance, are generated by the flow of pressurized oil, which flows from a supply 194 via respective flow restrictors 196 and 198 through respective tubings 200 and 202 to respective flapper nozzles 186 and 188.

When sensing means 16 is in the normal null position, the first and second pressure signals applied to the undersurface of sensing means 16 from respective nozzles 186 and 188 are of equal magnitude, and the differential pressure taken between respective back pressure output terminals 204 and 206 is zero, while the torque applied to the sensing means by the first and second signals is also zero. Referring to FIG. 5, when sensing means 16 is angularly displaced in the clockwise direction about torsional axis 18, the back pressure at output terminal 206 increases, while the back pressure at output terminal 204 decreases, thereby generating a differential output pressure signal which is proportional to angular movement of the sensing means about the torsional axis. Similarly, when the sensing means is displaced about its torsional axis in the counterclockwise direction, the back pressure across terminal 204 increases, and the back pressure across terminal 206 decreases thereby again generating a differential output pressure signal proportional to the angular movement of the sensing means about its torsional axis, whereby this signal is proportional to the angular velocity of the gyro about sensitive axis 12. This resultant differential pressure signal also is applied from nozzles 186 and 188 to the underside of sensing means 16 to provide the restoring torque necessary to return sensing means 16 to the normal null position.

Figure 6:
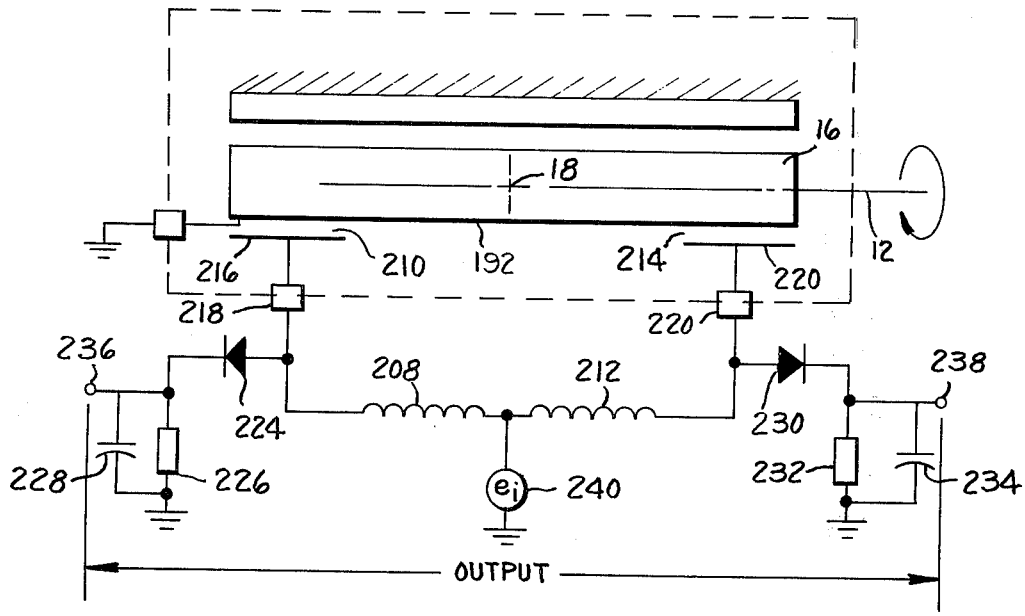
FIG. 6 is a schematic view of the gyro having an electrical output.

Referring to FIG. 6, the electrostatic responsive means is comprised of two tank circuits. The first tank circuit is comprised of a series combination of an inductor 208 and a capacitor 210, and the second tank circuit is comprised of an inductor 212 and a capacitor 214. Capacitor 210 is comprised of a flat plate electrode 216 and the electrically grounded undersurface 192 of sensing means 16. Electrode 216 is separated from undersurface 192 by a distance of approximately 0.002 to 0.005 inch, and is electrically isolated from supporting member 14 and enclosure 20 by standard insulative means 218. Similarly, capacitor 214 is comprised of an identical flat plate electrode 220 and undersurface 192 of sensing means 16. Electrode 220 is also separated from the undersurface of the sensing means 16 by a typical distance of approximately 0.002 to 0.005 inch, and is electrically isolated from supporting member 14 and enclosure 20 by standard insulative means 222. The oil within enclosure 20 comprises the dielectric material for capacitors 210 and 214. The electrical juncture between electrode 216 and inductor 208 is electrically connected to an anode of a blocking diode 224. The cathode of diode 224 is electrically connected to one of the respective terminals of a load resistor 226 and a filtering capacitor 228. The other respective terminals of resistor 226 and capacitor 228 are electrically connected to the circuit ground. Similarly, the electrical juncture between electrode 220 and inductor 212 is connected to an anode of a blocking diode 230. A cathode of diode 230 is electrically connected to one of the respective terminals of a load resistor 232 and a filtering capacitor 234. The other of the respective terminals of resistor 232 and capacitor 234 are electrically connected to the circuit ground. One output terminal 236 is electrically connected to the cathode of diode 224, and another output terminal is electrically connected to the cathode of diode 230. The differential output potential for the gyro is generated between terminals 236 and 238, while each of the tank circuits is excited by a voltage source 240 which is electrically connected between the juncture of inductors 208 and 212 and the circuit ground. Since the absolute value of each of capacitors 210 and 214 is inversely proportional to the distance of separation between each of the electrodes and undersurface 192 of sensing means 16, when the sensing means is in the normal null position, the capacitance of capacitors 210 and 214 is equal, and when the sensing means is angularly displaced about torsional axis 18, the capacitance of one of the sensing capacitors decreases while the capacitance of the other capacitor increases. The value of the inductances and their series capacitors is selected so that the series resonant frequency of each tank circuit is somewhat lower than the frequency of voltage source 240 when sensing means 16 is in the normal null position. When sensing means 16 is angularly displaced about torsional axis 18 in the clockwise direction (with reference to FIG. 6) the capacitance of capacitor 214 increases, while the capacitance of capacitor 210 decreases. This causes a shift in the resonant frequency of each of the tank circuits, thereby resulting in a rapid increase in voltage across capacitor 210 and a rapid decrease in voltage across capacitor 214. The electrostatic forces across the plates of capacitors 210 and 214 are thus sufficiently unbalanced to apply a restoring torque to sensing means 16 to return the sensing means to the normal null position. At the same time, an output voltage is generated across output terminals 236 and 238 which is proportional to the angular velocity of the gyro about its sensing axis 12. Once sensing means 16 returns to the normal null position, the differential voltage between terminals 236 and 238 returns to zero, as the potential of electrode 216 is then equal to the potential of electrode 220. Of course, if sensing means 16 rotates about torsional axis 18 in the counterclockwise direction, the capacitance of capacitor 210 increases and the capacitance of capacitor 214 decreases. The voltage across capacitor 210 then decreases, and the voltage across capacitor 214 increases, thereby applying the restoring torque necessary to return sensing means 16 to the normal null position. Again, the generated differential output voltage appearing across terminals 236 and 238 is proportional to the angular velocity of the sensing means about sensing axis 12.

Figure 7:
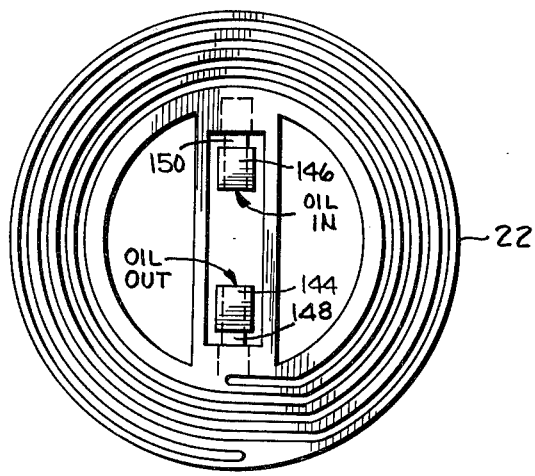
FIG. 7 is a top elevational view of an alternative form of a lamination of the sensing means which is depict as surrounding the pivotally mounting means, rather than being positioned between the pivotally mounting means as shown above in FIGS. 1 to 3.

At this point it should be noted that flexure springs 148 and 149 can be comprised of a suitable material such as stainless steel, while all of the remaining elements of gyro 10 can be comprised of a suitable material such as aluminum. It should also be noted that the air cavities in the stacked assembly which comprises coil 22, and other air cavities (not shown for the sake of clarity) have a predetermined volume so that the sensing means is of equal weight to an equal volume of oil, thereby rendering gyro 10 substantially insensitive to shock and vibration. Furthermore, while the embodiment depicted in FIG. 1 shows the sensing means positioned between posts 144 and 146, there may be times when it is necessary to have a smaller gyro. Under these circumstances the size of the gyro could be reduced by having coil 22 surround posts 144 and 146 as shown in FIG. 7, whereby the coil is still pivotally mounted to the posts by respective flexure springs 148 and 149.

In summary, the fluid flows through sensing means 16 in a clockwise direction with reference to FIG. 1, and if the angular velocity of the gyro is in the clockwise direction, then the sensing means rotates about its torsional axis in the clockwise direction. If the responsive means is fluidic, or in this instance hydraulic, then referring to FIG. 5, the back pressure at the exit of nozzle 188 increases while the back pressure at the exit of nozzles 186 decreases, thereby applying the necessary restoring torque to the sensing means to return it to the normal null position. At the same time, a differential output pressure signal is generated between output terminals 204 and 206, which signal is proportional to the angular velocity of the gyro about its sensitive axis. Alternatively, if the responsive means is electrostatic, the voltage across capacitor 214 decreases and the voltage across capacitor 210 increases, thereby again applying the necessary restoring torque to sensing means 16 to return it to its normal null position, while generating a differential output voltage across terminals 236 and 238, which voltage is proportional to the angular velocity of the gyro about its sensitive axis. Again referring to FIG. 1, if the angular velocity about sensitive axis 12 is in the counterclockwise direction, the angular momentum of the oil flowing through coil 22 causes sensing means 16 to rotate in the counterclockwise direction about torsional axis 18. Under these circumstances, the fluidic and electrostatic responsive means operate in the manner previously described above to apply a restoring torque to the sensing means, and to generate a differential output signal which is proportional to the angular velocity of the gyro about its sensitive axis. It is the application of the restoring torque to the sensing means by the electrostatic or fluidic responsive means which advantageously provides the gyro with its closed loop operation.

Although the invention has been described with reference to specific embodiments thereof, numerous modifications are possible without departing from the invention, and it is desirable to cover all modifications falling within the spirit and scope of this invention.

What I claim as new and desire to secure by Letters Patent of the United States is:

1. A closed loop fluidic angular rate gyro having a single sensitive axis, comprising:
   a. a supporting member;
   b. means for sensing movement of said gyro about said sensitive axis;
   c. means for pivotally mounting said sensing means to said supporting member and about a torsional axis which is perpendicular to said sensitive axis to maintain said sensing means in a normal null position and allow rotation of said sensing means about said torsional axis in response to the angular velocity of said gyro about said sensitive axis;
   d. means responsive to movement of said sensing means for providing a restoring torque to return said sensing means to said normal null position and for producing an output signal proportional to movement of said sensing means about said torsional axis, whereby said output signal is proportional to the angular velocity of said gyro about said sensitive axis; and c. said sensing means being comprised of a coil having a fluid flowing therethrough in a plane substantially parallel to a plane established by the intersection of said torsional axis and said sensitive axis when said coil is in the normal null position, whereby the angular momentum of said fluid flowing through said coil causes an angular displacement of said coil about said torsional axis in response to the angular velocity of said gyro about said sensitive axis.

2. A closed loop fluidic angular rate gyro according to claim 1, wherein said coil is comprised of a multiple turn spiral.

3. A closed loop fluidic angular rate gyro according to claim 2, wherein said coil is further comprised of at least first and second concentric adjacent sections fluidically coupled together.

4. A closed loop fluidic angular rate gyro according to claim 2, wherein said coil is comprised of a plurality of laminations fastened together, each of said laminations having a passageway defining the shape of said coil.

5. A closed loop angular rate gyro according to claim 1, wherein said fluid flowing through said coil is a liquid.

6. A closed loop angular rate gyro according to claim 5, wherein said liquid is comprised of oil.

7. A closed loop fluidic angular rate gyro according to claim 1, wherein said pivotally mounting means is comprised of:
 a. first and second posts fixed to said supporting member; and
 b. first and second flexure springs mechanically coupling said coil to said respective first and second posts.

8. A closed loop fluidic angular rate gyro according to claim 7, wherein said first and second flexure springs each has a passageway therethrough fluidically coupled to a respective end of said coil, and said first and second posts each has a passageway therethrough fluidically coupled to a respective one of said flexure spring passageways, whereby said fluid flows into said first post passageway through said first flexure spring passageway, said coil, said second flexure spring passageway and out of said second post passageway.

9. A closed loop angular rate gyro according to claim 7, wherein said coil is positioned between said first and second posts.

10. A closed loop angular rate gyro according to claim 7, wherein said coil surrounds said first and second posts.

11. A closed loop angular rate gyro according to claim 1, wherein the assembly of said supporting member, said coil and said pivotally mounting means is fixed within an oil filled enclosure.

12. A closed loop angular rate gyro according to claim 11, further comprising a flat damping plate laterally positioned between an upper surface of said enclosure and said coil to stabilize the closed loop operation of said gyro.

13. A closed loop angular rate gyro according to claim 11, wherein said sensing means is of equal weight to the weight of an equal volume of oil, whereby said gyro is rendered insensitive to shock and vibration.

14. A closed loop fluidic angular rate gyro having a single sensitive axis, comprising:
 a. a supporting member;
 b. means for sensing movement of said gyro about said sensitive axis;
 c. means for pivotally mounting said sensing means to said supporting member and about a torsional axis which is perpendicular to said sensitive axis to maintain said sensing means in a normal null position and allow rotation of said sensing means about said torsional axis in response to the angular velocity of said gyro about said sensitive axis;
 d. means responsive to movement of said sensing means for providing a restoring torque to return said sensing means to said normal null position and for producing an output signal proportional to movement of said sensing means about said torsional axis, said output signal being proportional to the angular velocity of said gyro about said sensitive axis, said responsive means being comprised of means for applying first and second fluidic signals to said sensing means at approximately equal respective distances from said torsional axis, the resultant pressure differential applied to said sensing means providing the restoring torque necessary to return said sensing means to the normal null position, and causes the generation of a differential output pressure signal proportional to movement of said sensing means about said torsional axis.

15. A closed loop fluidic angular rate gyro having a single sensitive axis, comprising:
 a. a supporting member;
 b. means for sensing movement of said gyro about said sensitive axis;
 c. means for pivotally mounting said sensing means to said supporting member and about a torsional axis which is perpendicular to said sensitive axis to maintain said sensing means in a normal null position and allow rotation of said sensing means about said torsional axis in response to the angular velocity of said gyro about said sensitive axis; and
 d. means responsive to movement of said sensing means for providing a restoring torque to return said sensing means to said normal null position and for producing an output signal proportional to movement of said sensing means about said torsional axis, said output signal being proportional to the angular velocity of said gyro about said sensitive axis, said responsive means being comprised of means for applying first and second electrostatic signals to said sensing means at approximately equal respective distances from said torsional axis, whereby upon movement of said sensing means about said torsional axis, the resultant electrostatically induced force differential applied to said sensing means provides the restoring torque necessary to return said sensing means to the normal null position, and causes the generation of an output differential voltage signal proportional to movement of said sensing means about said torsional axis.

* * * * *